March 28, 1939.  H. H. MOSS  2,152,145

METHOD AND APPARATUS FOR CUTTING AND HEAT-TREATING METAL

Filed April 30, 1936

INVENTOR
HERBERT H. MOSS
BY
Ed Greenewald
ATTORNEY

Patented Mar. 28, 1939

2,152,145

UNITED STATES PATENT OFFICE 2,152,145

METHOD AND APPARATUS FOR CUTTING AND HEAT-TREATING METAL

Herbert H. Moss, Brooklyn, N. Y., assignor to The Linde Air Products Company, a corporation of Ohio Application April 30, 1936, Serial No. 77,158

13 Claims. (Cl. 148—9)

This invention relates to the art of cutting metal, and more particularly to methods and apparatus for cutting and heat-treating air-hardening and quench-hardening steels.

In gas cutting the so-called air-hardening grades of steel and those grades which harden perceptibly under the quenching action of the cold metal adjacent to the cut, it has been found that heat is abstracted from the cut surfaces or edges at such a rate that the metal adjacent to these surfaces or edges becomes unduly hard and brittle and becomes subject to high localized stresses with a tendency toward surface checking or cracking, thus rendering the surfaces or edges more difficult to process or fabricate and unsafe to use.

Ordinarily when this condition arises, subsequent or preliminary heat treatment must be employed to anneal or temper the edges and to relieve the induced stresses. When the cutting operation is performed in the field, general heat-treating, as with a furnace, is impracticable. Even in a fabricating plant, where a furnace for accommodating all required sizes of cut metal bodies may be available, the treatment so applied is expensive, involves considerable time, and requires the attendance and close manipulation of an expert operator. When cutting certain steel shapes, as, for instance, manganese steel rails, frogs, and other self-hardening steel members, the use of subsequent furnace annealing upsets the originally formed grain structure, requiring additional treatment for its restoration.

Localized heat-treating, as by providing supplementary heat to one face of the metal being cut has been resorted to, but this method is unsatisfactory under certain conditions, for example when the body being cut, by virtue of its great heat capacity, conducts heat away from the cut edge at such a rapid rate as to cause quench hardening. Quench hardening is common not only to thick plates which are not sufficiently heated throughout by a flame applied to one surface, but also to certain shapes having extensions of metal adjacent to the cut edge. For example, when flame cutting a relatively thin flange from a T-section or rail, the heat may be conducted away so rapidly by the remaining flange and the adjoining web as to produce hardening effects even when supplementary heat is applied to one surface of the cut flange.

One object of the invention is, therefore, the provision of a method and an apparatus whereby thick metal may be cut economically. Another object is the provision of an improved method and apparatus for performing gas cutting operations and localized heat-treatment on metal bodies having great heat capacity. Other objects will become apparent upon consideration of the present specification.

The invention is illustrated in the accompanying drawing, wherein.

According to the present invention, supplementary high-temperature heat is locally directed against more than one surface of a body of metal to be cut, while the jet of a conventional cutting blowpipe is directed against one of the faces. By supplementary high-temperature heat is meant heat, additional to that provided by the preheating and oxidizing jets of the cutting blowpipe and such as might be obtained by a heating blowpipe, electric arc or similar source. The supplementary heat may be applied as preliminary heat in advance of the cutting operation, as post heat following the cutting operation, or a combination of both forms of supplementary heating may be used, but in any case the heat is applied locally, that is, only to successive relatively small areas along or directly adjacent to the line of cut.

Figure 1:
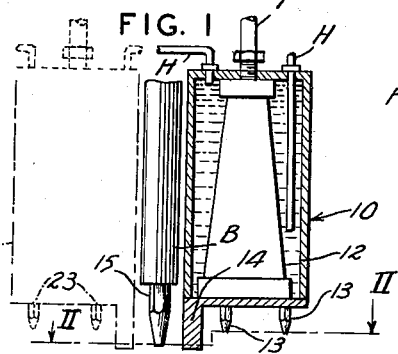
Fig. 1 is a side elevational view, partly in section of an apparatus embodying the invention, and of a thick piece of metal which is being cut thereby.
Figure 2:
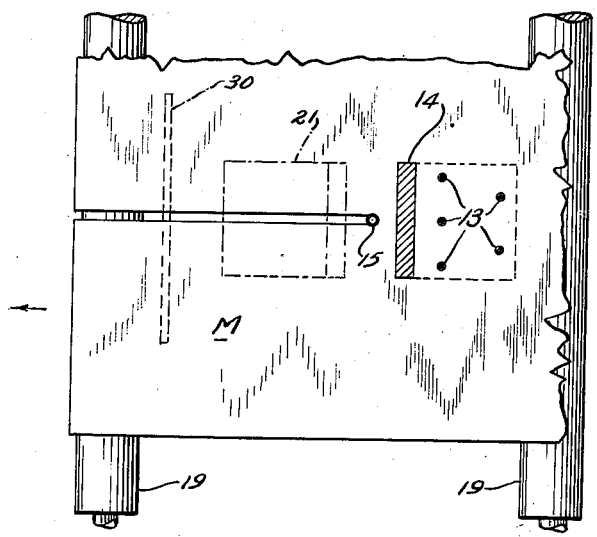
Fig. 2 is a fragmental plan view of the apparatus illustrated in Fig. 1 shown partly in section, taken on the line II—II of Fig. 1.

The same reference numerals will be used throughout the several views to designate similar parts. Referring now more particularly to the drawing, it will be seen that it shows a preliminary heating head 10 and an oppositely disposed preliminary heating head 11 spaced to allow a piece of metal M to pass between them in the direction indicated by the arrow. Referring now more especially to Figs. 1 and 2, the preliminary heating head 10 comprises a water-jacketed body 12 from which a plurality of heating tips 13 extend toward the metal piece M. Circulating cooling fluid passes to and from the head 10 through suitable hoses H. Heating gas admitted through tube T and projected in a flame from the heating tips 13 impinges upon the metal piece M and heats it. The water-jacketed body 12 protects the heating tips 13 against the intense heat so developed. A shield 14, in heat exchange forms a part of the water-jacketed body 12, and extends to a point adjacent to the metal M and between the tips 13 and a cutting blowpipe B.

A nozzle 15 forming part of the cutting blowpipe B is disposed in spaced relation to and at a substantial distance from the preliminary heating head 10 and in a position to project an oxidizing jet upon the metal passing therebeneath to cut through the metal. The nozzle 15 is provided with the usual means for projecting a high-temperature flame for locally preheating the metal directly adjacent to the jet of cutting gas. The nozzle 15 may be of the usual construction, for example, one having a centrally disposed cutting gas passage 22 therethrough surrounded by a plurality of fuel gas passages 22'. The nozzle 15 is not necessarily water-jacketed or otherwise cooled, as the water-cooled shield 14 protects it from the heating flame issuing from the preliminary heating head 10.

Like the head 10, the oppositely disposed preliminary heating head 11 comprises a water-jacketed body 16 from which a plurality of heating tips 17 extend toward the metal piece M. The head 11 may also have a water-cooled shield 18 extending to a point adjacent to the metal piece M, the function of which is to prevent the flame from the tips 17 from entering the lower part of the cut made in the metal piece M, and interfering with the cutting gas issuing from the nozzle 15. It is to be observed that no cutting nozzle is disposed adjacent to the water-jacketed body 16 or anywhere on the same side of the metal piece M therewith, as it is possible with the present invention to employ but a single cutting nozzle.

In the embodiment illustrated in Figs. 1 and 2, the metal piece M may be a relatively wide and thick plate M supported upon rollers 19 which are shown in the drawing as being rotatable in a counterclockwise direction. The metal piece may thus be moved first past the preliminary heating tips 13 and 17 to receive supplementary heat and then past the cutting nozzle 15. To this end, one or more of the rollers 19 may be rotated in any known or convenient manner. It is to be understood however that the respective heating and cutting means may be mounted as a unitary assembly upon convenient mechanism for movement with respect to a stationary metal work piece.

One or more screens 30 may be located beneath the metal piece M in a position to protect the rollers 19 from the destructive action of the cutting or heating jets.

Under certain conditions, it may be desirable to provide supplementary heat to the metal piece M subsequent to the cutting operation. Accordingly, provision is made for at least one pair of post heating heads 20 and 21, shown in broken lines in Figs. 1 and 2, and in solid lines in Fig. 3, of a construction similar to the preliminary heating heads 10 and 11. As shown in Fig. 1, the post heating heads are disposed so as to direct flames from tips 23 and 27 against the respective sides of the metal piece M and are arranged with the respective water-cooled shields nearest the cutting blowpipe in the manner shown.

Figure 3:
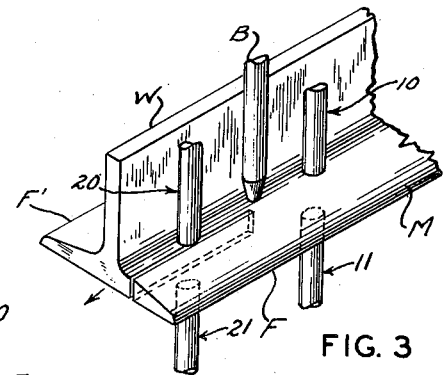
Fig. 3 is an isometric view diagrammatically showing one form of apparatus embodying the present invention adapted for use in cutting a flange from a structural element.
Figure 4:
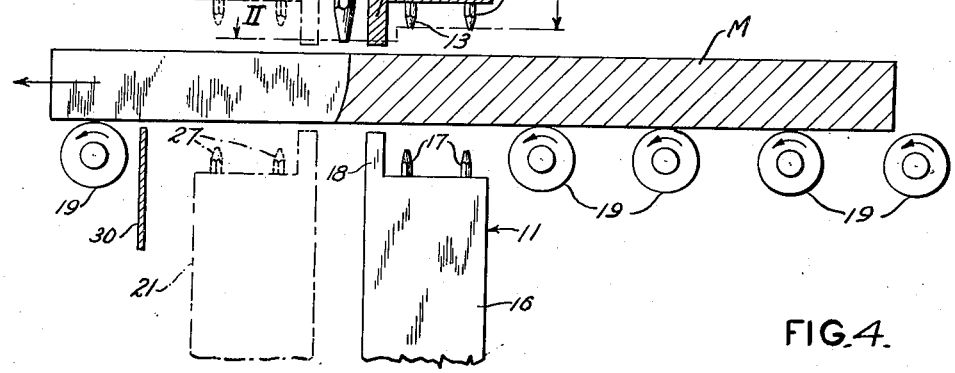
Fig. 4 is an enlarged end elevational view of the cutting nozzle.
Figure 4:
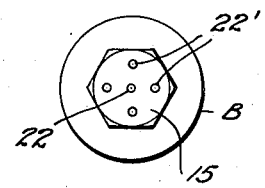

As shown in Fig. 3, the respective heating heads are aligned in a vertical plane substantially along the line of the cut. If desired the upper heads may be tilted slightly so as to be positioned perpendicularly with respect to the sloping surface of the flange F. Similarly, one or more sets of the heating heads may be positioned at any angle so as to direct the heat against either opposite, or adjacent surfaces the jets being supplied in substantially opposite directions when heating opposite surfaces. For example, when the cut is made close to one edge as for a flame-machining process, or when a thin slice is taken from the edge, supplementary heat may be applied locally to the edge of the metal member as well as to the top and bottom surfaces. It will be noticed in Fig. 3, that although a relatively thin metal member is being cut, considerable heat conduction takes place along the remaining flange F' and in the web W. The conduction is even more pronounced when a second flange is formed on top of the web as in standard beam construction, or when a rail head is present. Applying local supplementary heat to more than one surface has been found useful, therefore, in eliminating hardening action in thick plates as well as in members of thinner cross-section which possess unusual heat-dissipating qualities.

From the foregoing description, the operation of the invention will be obvious. The metal piece M is moved to the left, as viewed in the drawing, and supplementary heat is continuously applied locally to both the top and bottom faces thereof from the heating heads 10, 11, 20 and 21. One face is further locally preheated by the fuel gas flames issuing from the passages 22' of the nozzle 15, and the metal is cut by the jet of cutting gas which issues from the passage 22 of the same nozzle. The heating heads 10, 11, 20, and 21 may employ other heating means, as for example, an electric arc, instead of a high-temperature gaseous flame.

The metal piece M is thus provided with preliminary heat locally applied to opposite faces of the plate, in advance of the application of the local cutting preheat and the cutting jet. The size of the flames, the distance of separation from the cutting jet, and the rate of travel are adjusted so that the preliminary heat has soaked into the metal adjoining the line of cut, raising its temperature to such a degree that subsequent hardening is minimized or eliminated. At the same time, the introduction of supplementary preliminary heat helps to prepare the metal for the cutting operation, resulting in an increase in cutting speed and in operating efficiency. The supplementary preliminary heat may be sufficient to raise the metal to the combustion temperature, in which case the cutting preheat might be dispensed with. Since preliminary heat is applied to the under surface as well as to the upper surface, metal of thicker cross section may be cut. When the heads 20 and 21 are employed to locally apply supplementary post heat to the upper and lower surfaces, either alone or in conjunction with the preliminary heat, cooling of the metal adjacent to the cut edge is retarded and quench hardening minimized. It has been found that by properly spacing the source of post heat from the cutting jet and by properly adjusting the amount of preliminary heat, a moderate quench-hardening action may be obtained immediately after the cutting operation, in which event, the post heat may be employed to perform a secondary heat-treatment as, for example, tempering, annealing, normalizing, or relieving initial stresses of the metal adjoining the cut edge.

In any case, it is possible with my method and apparatus to economically perform gas cutting operations upon steels of a hardening nature, and simultaneously with the cutting to relieve the hardness resulting therefrom. Through the application of supplementary heat locally to successive areas of more than one surface, metal bodies of certain compositions, of excessive thickness, or of peculiar shape, which formerly precluded, or rendered difficult, the use of gas cutting because of consequent hardening, may now enjoy the use of such cutting method, with all of its inherent advantages, and without deleterious after effects. The method and apparatus herein disclosed are especially adapted for portable use.

By selectively spacing the respective heat sources with respect to one another the nature of the heat treatment may be controlled. Any desired number and spacing of the heating tips 13, 17, 23, and 27 may be employed to satisfy the particular requirements of the work, the specific arrangement of Fig. 2 being shown solely for the purpose of illustrating one form of the invention. Under certain conditions the strip adjoining one side of the cut is rejected as scrap and need not be provided with supplementary heat. Accordingly, any desired number of heating tips may be rendered inoperative, in any convenient manner, so as to economize on gas consumption when all tips are not in use. Under ordinary conditions, as where the metal adjoining both sides of the cut is intended for subsequent use, all tips are employed, the heat sources are aligned with respect to the cut, and simultaneous localized heat-treatment is performed on the two separate pieces. By employing a group of small tips in place of a single larger tip, higher heating efficiency is obtainable.

The embodiment described and illustrated in the accompanying drawing is presented merely to indicate how the invention may be applied.

I claim:

1. A method of gas-cutting a ferrous metal body and concurrently counteracting the hardening effect induced in said body by such cutting operation, said method comprising applying a high temperature flame against successive portions of one surface of said body to preheat such portions to a kindling temperature; applying an oxidizing jet against such successively preheated portions; concurrently directing supplementary high temperature heating flames locally against opposite surfaces of said body at points removed from the point of application of such preheating flame and said oxidizing jet but located substantially along the line of cut; and effecting motion of said body relative to such preheating flame, oxidizing jet and supplementary flames along the line of cut to produce a cut in said body and simultaneously counteract the hardening effects induced by the cutting operation.

2. In a method of cutting ferrous metal, the steps comprising applying supplementary preliminary heat locally to the metal from above, applying supplementary preliminary heat locally to the metal from below, preheating the metal locally from above at a point spaced from the point of application of said first-named preliminary heat, and gas-cutting the metal through the locally preheated area.

3. In a method of cutting ferrous metal, the steps comprising locally preheating one face of the metal; applying a gaseous oxidizing jet to such preheated face; and locally applying supplementary heat to a relatively small zone of more than one surface of the metal adjacent to the line of cut, the sources of said supplementary heat being applied substantially perpendicularly to such respective surfaces.

4. In a method of cutting and heat treating ferrous metal, the steps comprising applying an oxidizing jet to a heated face of the metal to be cut; and applying supplementary post heat locally to a relatively small zone of more than one surface of the metal adjacent to the cut, the sources of said supplementary post heat being directed substantially perpendicularly against said respective surfaces.

5. Metal treating apparatus comprising a cutting blowpipe, a nozzle on said blowpipe for directing a stream of cutting fluid against one surface of a body of metal to be cut, and supplementary heating means disposed adjacent to different sides of said body so as to direct supplementary high-temperature heat locally against more than one surface of the metal adjoining the line of cut.

6. Apparatus for cutting a metal body which comprises spaced and opposed devices for applying high-temperature heat along the line of cutting to opposite surfaces of a metal body disposed between said devices; blowpipe means adjacent to one of said devices for applying gaseous heating and oxidizing agents along the line of cutting to one of said surfaces; and mechanism for causing relative movement of said body with respect to said devices and blowpipe means, in the line of cutting.

7. A metal cutting apparatus comprising a preliminary heating head, an oppositely disposed preliminary heating head, said heads being positioned so as to receive a body of metal between them, a nozzle adjacent to said first-named preliminary heating head for applying both local preheat and a cutting gas jet to one surface of the metal, and means for providing relative movement between the metal to be cut on the one hand, and said preliminary heating heads and said nozzle on the other hand.

8. Metal cutting and treating apparatus comprising a first pair of spaced heating heads disposed so as to direct high-temperature heat against a first surface of a body of metal to be cut to heat spaced zones thereof substantially along the line of cut, a second pair of spaced heating heads disposed so as to direct high-temperature heat against a second surface of the body of metal to be cut to supply additional heat to said zones, and a cutting blowpipe positioned between said first pair of heating heads, and arranged so as to direct a jet of cutting gas against the first surface of the body to be cut.

9. Metal cutting and treating apparatus according to claim 6 including a shield for protecting said blowpipe means from the high temperature heat of at least one of said devices.

10. Metal cutting and treating apparatus comprising a supplementary heating head, a water-cooled shield extending therefrom, a plurality of supplementary heating tips extending from said head in the same direction as said shield, an oppositely disposed water-cooled supplementary heating head, a shield extending therefrom toward said first-named shield, and a plurality of supplementary heating tips extending from said second head toward said first-named tips, a cutting blowpipe spaced from said first-named head and adjacent to said first-named shield, and means for passing the metal to be cut between said supplementary heating heads and adjacent to said blowpipe, substantially as described.

11. A method of cutting and treating ferrous metal bodies comprising progressively heating adjacent to the line of cut relatively small spaced areas of one surface of the body to be cut; concurrently therewith progressively heating correspondingly located spaced areas of an opposite surface of the body to be cut; and progressively applying gaseous heating and oxidizing agents to one of said surfaces at a point between said spaced areas.

12. A method of cutting and treating ferrous metal bodies comprising gas cutting the body by progressively applying high temperature heating and oxidizing agents along one surface of the body to be cut; progressively cooling the edges adjoining the cut; and progressively applying local high temperature heat to said surface and to the opposite surface of said body along a path adjoining the cut, thereby heating said cooled edges to counteract metallurgical changes produced by the cutting and cooling operations.

13. A method of cutting and treating ferrous metal bodies comprising gas cutting the body by progressively applying high temperature heating and oxidizing agents along one surface of the body to be cut; progressively quenching the edges adjoining the successive cut portions to harden said edges; and progressively applying local tempering heat to said surface and to the opposite surface along a path adjoining the cut, thereby reheating the quenched edges to effect a secondary heat-treatment.

HERBERT H. MOSS.